United States Patent
Kim et al.

(10) Patent No.: US 9,553,770 B2
(45) Date of Patent: Jan. 24, 2017

(54) METHOD FOR CONTROLLING SOFTWARE DEFINED NETWORK AND APPARATUS FOR THE SAME

(71) Applicant: ELECTRONICS & TELECOMMUNICATIONS RESEARCH INSTITUTE, Daejeon (KR)

(72) Inventors: Eun Joo Kim, Daejeon (KR); Yool Kwon, Daejeon (KR); Young Boo Kim, Sejong-si (KR)

(73) Assignee: ELECTRONICS & TELECOMMUNICATIONS RESEARCH INSTITUTE, Daejeon (KR)

(*) Notice: Subject to any disclaimer, the term of this patent is extended or adjusted under 35 U.S.C. 154(b) by 73 days.

(21) Appl. No.: 14/313,108

(22) Filed: Jun. 24, 2014

(65) Prior Publication Data

US 2014/0376406 A1   Dec. 25, 2014

(30) Foreign Application Priority Data

Jun. 24, 2013   (KR) .................. 10-2013-0072198

(51) Int. Cl.
*H04J 3/24* (2006.01)
*H04L 12/24* (2006.01)

(52) U.S. Cl.
CPC .......... *H04L 41/12* (2013.01); *H04L 41/0883* (2013.01)

(58) Field of Classification Search
CPC .............................. H04L 41/12; H04L 41/0883
See application file for complete search history.

(56) References Cited

U.S. PATENT DOCUMENTS

| | | | | |
|---|---|---|---|---|
| 8,031,851 B2* | 10/2011 | Holt | ........................ | H04M 3/38 379/201.02 |
| 8,693,374 B1* | 4/2014 | Murphy | ................... | H04L 12/28 370/255 |
| 8,711,855 B1* | 4/2014 | Murphy | ................... | H04L 12/28 370/254 |
| 2009/0067613 A9* | 3/2009 | Holt | ........................ | H04M 3/38 379/350 |
| 2010/0054257 A1 | 3/2010 | Dolganow et al. | | |
| 2013/0058225 A1* | 3/2013 | Casado | ............... | H04L 12/4633 370/250 |

(Continued)

FOREIGN PATENT DOCUMENTS

KR    20110039472 A    4/2011

*Primary Examiner* — Phuc Tran
(74) *Attorney, Agent, or Firm* — Ladas & Parry LLP (57) ABSTRACT

Disclosed are a method for SDN based network management and an apparatus performing the same. A method for network management, performed in a central control apparatus, may comprise receiving a path request message indicating a request to configure a path from a terminal; generating path list information including information about at least one configurable path, and providing the terminal with the path list information; receiving information about a specific path selected in the path list information from the terminal; and transmitting information about at least one detail function included in each of at least one node constituting the selected specific path to the terminal. Therefore, a path optimized for user's requirements may be easily configured, and so service quality may be enhanced.

14 Claims, 6 Drawing Sheets

(56) References Cited

U.S. PATENT DOCUMENTS

2013/0250770 A1\* 9/2013 Zou .................. H04L 47/19
 370/238
2013/0329601 A1\* 12/2013 Yin .................. H04L 45/02
 370/254

\* cited by examiner

METHOD FOR CONTROLLING SOFTWARE DEFINED NETWORK AND APPARATUS FOR THE SAME

CLAIM FOR PRIORITY

This application claims priority to Korean Patent Application No. 10-2013-0072198 filed on Jun. 24, 2013 in the Korean Intellectual Property Office (KIPO), the entire contents of which are hereby incorporated by references.

BACKGROUND

1. Technical Field

Example embodiments of the present invention relate to a technology for network management, and more specifically to a method for network management which can be applied to configuration of traffic paths and functions of nodes included in the paths in a network based on a software defined network (SDN), and an apparatus performing the same.

2. Related Art

In order to cope with recent expansion of cloud services for smart phones or pad-type terminals, explosive increase of contents, and environmental changes of companies, technologies of software defined networking (hereinafter, referred to as 'SDN'), for providing flexibility of network and efficient network management functions, have appeared.

The SDN has characteristics that it separates network control functions and packet forwarding functions, performs control functions in a centralized control plane, and configures a network in programming manner.

In the conventional network, each switch node constituting the network having an auto routing function performs packet routing. The auto routing function is efficient for a simple network structure since each switch performs packet routing automatically. However, as network structure becomes complicated according to explosive increase of data, amount of traffic which can be treated by the auto routing function has reached a limit.

In order to overcome the above-described problem of the conventional network, in the SDN, a path of data traffic is configured by the centralized control plane in provisioning manner, so that the problem of the conventional network may be resolved and a time for required for installing new applications may be reduced. The SDN may provide operators with flexibility in configuration, management, and security of network.

Meanwhile, in order to efficiently cope with recent explosive increase of data traffic, efforts to construct a smart network are going on. As one of the efforts, a function of each switch node is being intensified. For example, although the conventional node inspects only a header of a received packet, a current switch node may be configured to perform a deep packet inspection (DPI) function, which can inspect a payload part of a received packet at high speed A switch node becomes able to provide various services such as firewall, encryption, image processing, etc. by using the DPI function. Also, currently, a switch node having a storage function configured to provide contents or services more efficiently is being used.

However, it is difficult to combine a smart network technology which provides the above-described various services with the SDN technology which pursues standardization of control functions of switch nodes.

For example, the scheme of control commands for the SDN, which is being standardized, has a limit of accommodating functions of a switch node pursuing various services.

Therefore, in order to efficiently combine the smart network with the SDN, a function of configuring detail functions of switch nodes in a centralized manner is demanded in addition to the centralized path configuration.

SUMMARY

Accordingly, example embodiments of the present invention are provided to substantially obviate one or more problems due to limitations and disadvantages of the related art.

An objective of the present invention to resolve the above-described problems is to provide a method for network management which can configure traffic paths and functions of each switch node in software defined networking (SDN) based network.

Also, another objective of the present invention is to provide an apparatus performing the above-described method for network management based on the SDN.

The objectives which the present invention pursues are not restricted to the above-described objectives, and any other objectives which are not described in the present specification may be clearly understood to persons skilled in the art to which the present invention pertains.

A method for SDN based network management to achieve the above-described objectives, as a method performed in a central control apparatus according to the an aspect of the present invention, may comprise receiving a path request message indicating a request to configure a path from a terminal; generating path list information including information about at least one configurable path, and providing the terminal with the path list information; receiving information indicating a specific path selected in the path list information from the terminal; and transmitting information indicating at least one node function included in at least one node constituting the selected specific path to the terminal.

In the providing the terminal with the path list information, the path list information may be provided to the terminal in a menu form which enables a user to select the specific path. Here, the path list information may include information about at least one path, at least one identifier corresponding to the at least one path, and at least one selection tool enabling the user to select the specific path among the at least one path.

In the transmitting information indicating at least one node function included in at least one node constituting the selected specific path to the terminal, the information may be transmitted to the terminal as configured to be a menu form in which information indicating at least one node function included in each of the at least one node constituting the selected specific path is displayed relating to the selected specific path.

In the generating path list information including information about at least one configurable path, the information about at least one configurable path may be constructed based on at least one of routing path information, service quality information, and bandwidth information.

Here, the at least one node function included in each of at least one node may include at least one of a Quality of Service (QoS) control function, a security management function, an encryption management function, an image resolution management function on image data, and an adult-only service management function.

Also, the method may further comprise, after transmitting information indicating at least one node function included in at least one node constituting the selected specific path to the terminal, receiving, from the terminal, information indicating at least one node function selected in the at least one node function included in at least one node constituting the selected specific path; calculating a path based on the received information indicating at least one node function selected; and configuring the calculated path.

A method for SDN based network management to achieve the above-described objectives, as a method performed in a user terminal according to the an aspect of the present invention, may comprise transmitting a path request message indicating a request to configure a path to a central control apparatus; receiving path list information including information about at least one configurable path from the terminal, and displaying the path list information; transmitting information indicating a specific path selected in the path list information to the central control apparatus; and receiving information about at least one node function included in at least one node constituting the selected specific path, and displaying the information about at least one node function included in at least one node constituting the selected specific path.

In the displaying the path list information, the path list information may be displayed in a selectable menu form enabling a user to select the specific path. Here, the path list information may include information about at least one path, at least one identifier corresponding to the at least one path, and at least one selection tool supporting a user to select the specific path among the at least one path.

In the displaying the information about at least one node function included in at least one node constituting the selected specific path, the information about at least one node function may be displayed in a menu form in which information about at least one function included in each of at least one node is related to the selected specific path and at least one of node function can be selected among the at least one node function included in each of at least one node.

Here, the path request message may include at least one of routing path information, service quality information, and bandwidth information.

Here, the at least one node function included in at least one node may include at least one of a Quality of Service (QoS) control function, a security management function, an encryption management function, an image resolution management function on image data, and an adult-only service management function.

An apparatus for SDN based network management to achieve the above-described objectives, as a central control apparatus performing the method according to the an aspect of the present invention, a processing part providing, in response to a path request of a terminal, the terminal with path list information about at least one configurable path and node function information about at least node function included in at least one node constituting a specific path selected in the path list information; and a communication part performing communications with the terminal, and transmitting, according to control of the processing part, the path list information and the node function information.

Here, the processing part may construct the path list information and the node function information in menu forms in which the specific path can be selected in the path list information and at least one node function can be selected in the node function information.

Here, the processing part may configure the specific path based on at least one node function selected in the node function information, and control each of the at least one node constituting the specific path so as to configure the specific path.

As described above, according to a method for SDN-based network management and an apparatus performing the same, when a user requests information about paths and functions of nodes included in paths, the central control apparatus provides a user terminal with path list information including information about configurable paths, and then the user terminal displays the path list information received from the central control apparatus in a selectable menu form. Also, if the user selects a specific path by referring to the displayed path list information, the central control apparatus provides the user terminal with node function information including information about node functions of each switch node belong to the specific path. The user terminal displays the node function information received from the central control apparatus in a selectable menu form in which the user can select at least one node function desired by the user, and transmits information indicating the at least one node function selected by the user to the central control apparatus. Then, the central control apparatus performs control for configuring the specific path based on the information indicating the at least one node function selected by the user.

Therefore, a path optimized for user's requirements may be easily configured, and so service quality may be enhanced.

Also, a smart network may be efficiently operated by providing the user with functions desired by the user through switch nodes constituting the specific path.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are disclosed herein. However, specific structural and functional detail disclosed herein are merely representative for purposes of describing example embodiments of the present invention, however, example embodiments of the present invention may be embodied in many alternate forms and should not be construed as limited to example embodiments of the present invention set forth herein. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that when an element is referred to as being "on" or "below" another element, it can be directly on another element or intervening elements may be present.

It will be understood that, although the terms first, second, A, B, etc. may be used herein to describe various elements, these elements should not be limited by these terms. These terms are only used to distinguish one element from another. For example, a first element could be termed a second element, and similarly, a second element could be termed a first element, without departing from the scope of the present invention. As used here, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a 'control apparatus' or a 'controller' in the specification means a functional entity controlling related components (for example, switches, routers, etc.) in order to control flows of traffic, and is not restricted to a specific physical implementation or a specific implementation position. For example, the controller may mean a controller functional entity defined in ONF, IETF, ETSI, or ITU-T. Also, a 'communication apparatus' or a 'switch' in the specification means a functional entity performing traffic (or, packet) forwarding, switching, or routing, and means a switch, a router, a switching element, a routing element, a forwarding element, etc. defined in ONF, IETF, ETSI, or ITU-T.

Also, the example embodiments of the present invention in the following description may be supported by standard specification documents written in ONE IETF, ETSI, or ITU-T which are progressing standardization on SDN technologies. In other words, parts of the example embodiments which are not explained in the following description in order to clarify the technical spirit of the present invention may be supported by the standard documents written by the above-described standardization organizations. Also, all terminologies used in the present invention may be explained based on the above standard documents.

Hereinafter, embodiments of the present invention will be described in detail with reference to the appended drawings. In the following description, for easy understanding, like numbers refer to like elements throughout the description of the figures regardless of number of the figures.

An example embodiment of the present invention provides a method for configuring a data traffic path in a SDN based network and configuring functions of each switch node constituting the configured data traffic path.

In an example embodiment of the present invention, when a user requests configuration of a path for a communication service, a centralized control apparatus of the SDN provides a list of configurable paths to the user, and the user can select the most appropriate path suitable for a service demanded by the user in the list of configurable paths. Also, the centralized control apparatus may provide the user with information about node functions supported by each switch node constituting the path in a selectable menu format, so that the user may select at least one node function of each switch node constituting the path which can provide at least one service desired by the user.

In other words, in the present invention, detail functions of each switch node may be utilized as network resources, so that a traffic path supporting a user-customized service efficiently may be provided.

Hereinafter, a method and an apparatus for SDN based network management according to example embodiments of the present invention will be explained by referring related figures.

Figure 1:
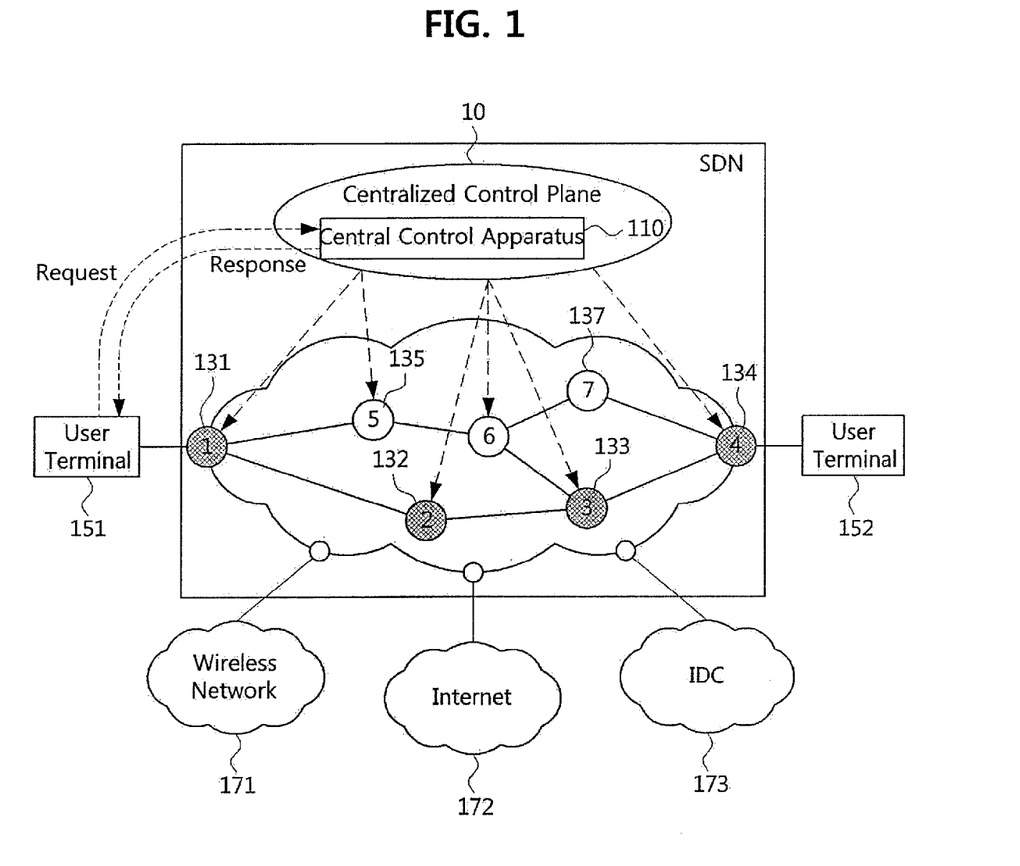
FIG. 1 is a conceptual diagram illustrating a method for SDN based network management according to an example embodiment of the present invention.

FIG. 1 is a conceptual diagram illustrating a method for SDN based network management according to an example embodiment of the present invention, and the conceptual diagram explains a configuration of a SDN based network and a method for configuration of a data path in the SDN based network.

Referring to FIG. 1, a method for network management according to an example embodiment of the present invention may be applied to a SDN based network comprising a central control apparatus 110 and a plurality of switch nodes 131 to 137. Also, the SDN based network may be connected to various communication apparatuses and networks such as user terminals 151 and 152, a wireless network 171, an internet 172, and an internet data center (IDC) 173. Here, the user terminal 151 or 152 may be an information processing apparatus such as a computer of a user, a company, or a data center.

The central control apparatus 110 may be located in a centralized control plane 10, and connected to a plurality of switch nodes 131 to 137, so that it controls traffic flows and detail functions of each of the switch nodes 131 to 137 by controlling operations of the plurality of switch nodes 131 to 137. The central control apparatus 110 may be managed by an operator of the SDN network.

The central control apparatus 110 may construct flow tables for each of the plurality of switch nodes 131 to 137, configure a packet forwarding path (or, a traffic path; for example, a path comprising nodes 131, 132, 133, and 134) of the SDN network from the user terminal 151 (that is, a transmitting user terminal) to the user terminal 152 (that is, a receiving user terminal), and provide each of switch nodes 131 to 134 included in the configured path with information about the configured path.

Also, in response to a data path configuration request from the user terminal 151 (or, the transmitting user terminal), the central control apparatus 110 may provide the user terminal 151 with a list of configurable paths in a menu format (also referred to as 'path list information'). If the user selects a specific path in the list of configurable paths, the central control apparatus 110 may provide the user with information about detail functions supported by switch nodes constituting the selected path so that the user can directly select at least one function of the switch nodes constituting the selected path.

The switch nodes 131 to 137 may perform basic functions of communication node respectively, construct flow tables based on control information provided from the central control apparatus 110, and process received packets according to rules defined in the constructed flow table. Here, a flow may be packets having identical predefined properties. For example, a flow may be defined as packets having the identical Transmission Control Protocol (TCP) connection, Medium Access Control (MAC) address, IP address, or the identical Virtual Local Area Network (VLAN) value.

Each of the switch nodes 131 to 137 may forward a received packet toward a port defined in its flow table. Also, if the received packet is a first packet of a new flow which is not yet registered in the flow table, it may forward the received packet to the central control apparatus 110 located in external via a security channel, so that the central control apparatus determines whether to register the new flow in the flow table. Alternatively, each of the switch nodes 131 to 137 may drop the received packet.

Meanwhile, each of the switch nodes 131 to 137 may have various node functions in addition to the above-described basic functions including the traffic switching function, and be configured to execute at least one function selected by a user. For example, each of the switch nodes 131 to 137 may have a firewall function based on DPI, an encryption function, an adult-only service management function (a function of preventing adult-only services from being provided to children), an image resolution adjustment function, a charging function, a data storage function, a voice response function, and the like. Also, each of the switch nodes 131 to 137 may have a user programmable function.

Figure 2A:
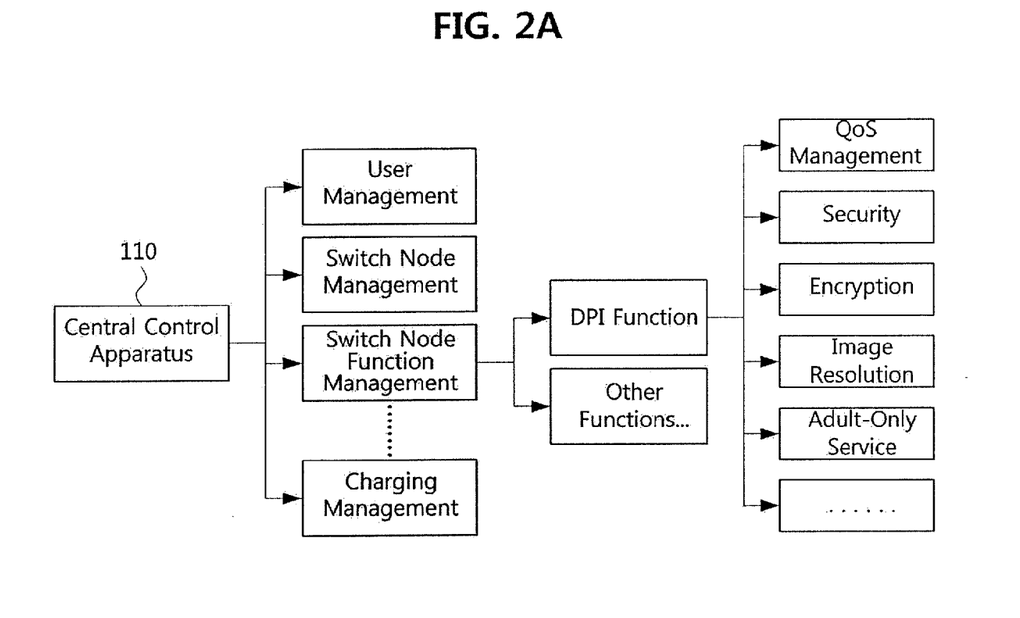
FIG. 2A is a block diagram explaining management functions of a central control apparatus according to an example embodiment of the present invention.
Figure 2B:
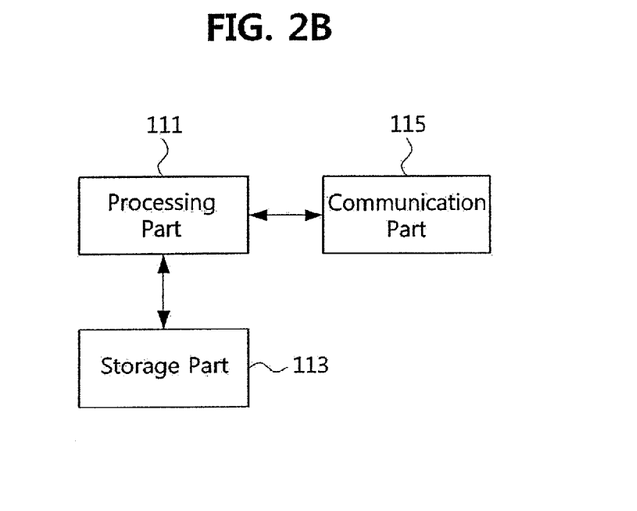
FIG. 2B is a block diagram explaining a configuration of a central control apparatus according to an example embodiment of the present invention.

FIG. 2A is a block diagram explaining management functions of a central control apparatus according to an example embodiment of the present invention, and FIG. 2B is a block diagram explaining a configuration of a central control apparatus according to an example embodiment of the present invention.

Referring to FIG. 2A, the central control apparatus 110 manages switch nodes in the SDN network. For example, the central control apparatus 110 may perform user management, switch node management, switch node function management, and charging management.

The user management may include management on personal information of respective users, content/service usage history of users, etc.

The switch node management may include management on connections between neighbor nodes of each switch node (that is, topology management), management on bandwidth which can be handled by each switch node, etc.

The switch node function management is for managing functions of each switch node based on the DPI function. It may include Quality of Service (QoS) management on data treated in each switch node, security management, encryption management, image resolution adjustment management (when data treated by each switch node is video data), adult-only service management, etc. In addition to the above basic management functions, the switch node function management may include managements on various functions of each switch node.

The charging management may include management on charging for users using services or contents in the SDN network.

Referring to FIG. 2B, in order to perform the above-described management functions, the central control apparatus 110 may comprise a processing part 111, a storage part 113, and a communication part 115.

The processing part 111 may be configured with at least one processor, and performs the above-described user management, switch node management, switch node function management, and charging management.

The storage part 113 may be configured with a non-volatile storage mean having a large capacity, and store data needed for the central control apparatus 110 to perform the above-described management functions and result data of the managements.

The communication part 115 may be configured with a wired or wireless communication interface, and exchange data with a plurality of switch nodes and various communication apparatuses constituting the SDN network according to control of the processing part 111.

Figure 3:
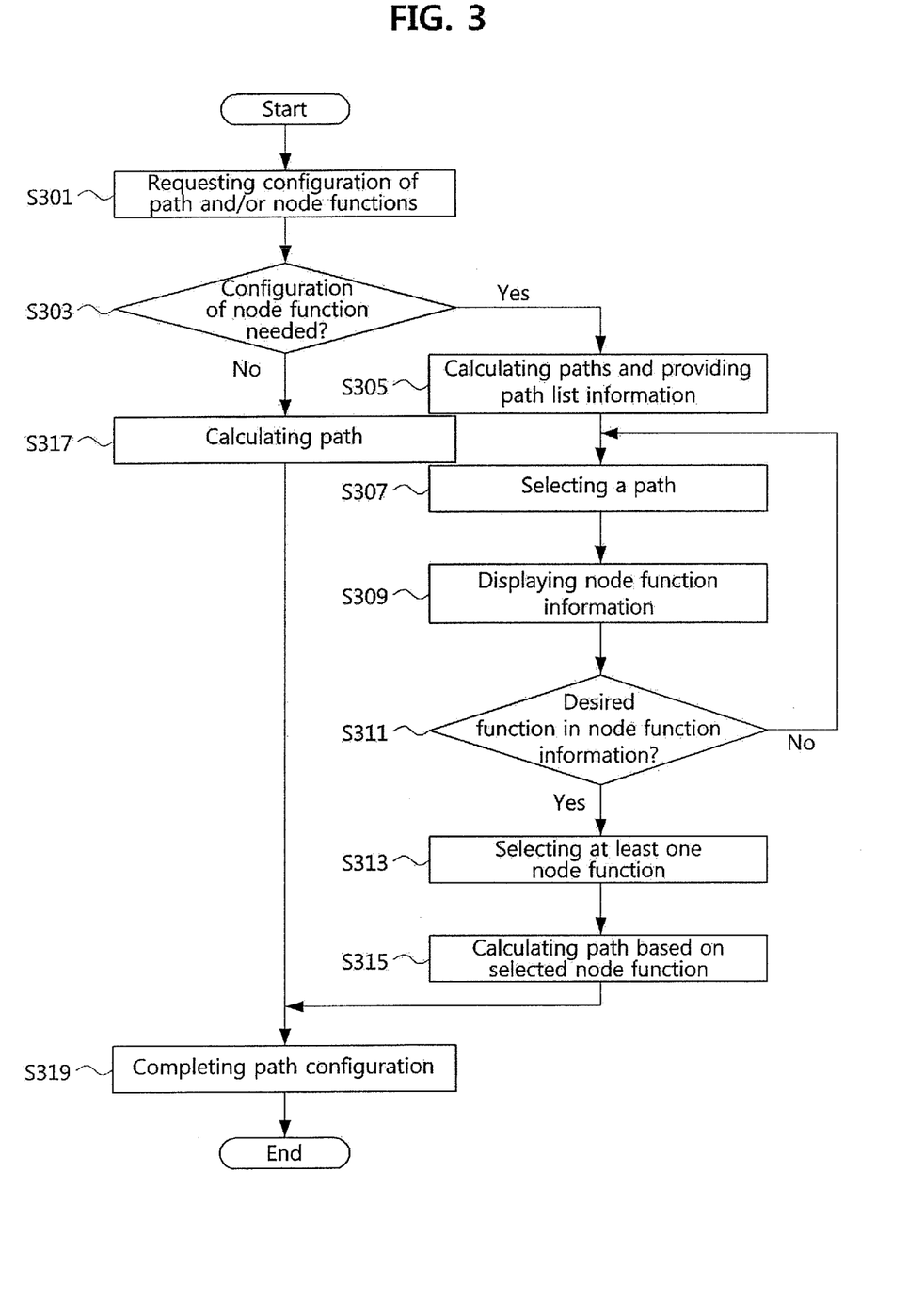
FIG. 3 is a flow chart illustrating a method for SDN-based network management according to an example embodiment of the present invention.

FIG. 3 is a flow chart illustrating a method for SDN-based network management according to an example embodiment of the present invention, and illustrates a procedure for configuring a data traffic path from a transmitting user terminal to a receiving user terminal and configuring at least one function of each switch node in a SDN based network.

Referring to FIG. 3, first, the transmitting user terminal may transmit a message requesting configuration of a path and/or configuration of at least one node function in a path to a central control apparatus (S301). Here, the transmitting user terminal may be an information processing apparatus such as a computer of a user, a company, or an IDC. Also, the message transmitted from the transmitting user terminal to the central control apparatus may include information such as an address of the transmitting user terminal, an address of the receiving user terminal, and service request information, and information about path parameters such as a required bandwidth, a required QoS class, a required transmission rate, the shortest routing path, etc. In this case, the transmitting user terminal may transmit a message requesting only configuration of a path to the central control apparatus. Alternatively, the transmitting user terminal may transmit a message requesting both configuration of a path and configuration of node functions in the path.

When the central control apparatus receives the message requesting configuration of a path and/or node function from the transmitting user terminal, it may transmit, in response to the message, a message to query about whether the configuration of node function is needed or not to the transmitting user terminal (S303). If the transmitting user terminal transmitted the message requesting configuration of both a path and node function to the central control apparatus, the central control apparatus may not perform the steps S303 and S317. That is, if the transmitting user terminal explicitly requested configuration of a path and configuration of node functions in the step S301, the central control apparatus may not perform the step S303 for transmitting the query message to the transmitting user terminal and the step S317 of calculating a path for a case that node functions are not needed to be configured.

Meanwhile, if the transmitting user terminal responds to the central control apparatus as node function of each switch node is required to be configured, the central control apparatus calculates a traffic path, and transmits path list information including information on all configurable paths based on the calculated traffic path information (S305).

Here, the central control apparatus may configure path list information including at least one path, considering information such as transmission bandwidth of each path, QoS of each path, and transmission rate of each path, shortest routing path, and so on. As will be explained in the following description, information about all configurable paths transmitted from the central control apparatus to the transmitting user terminal (that is, 'path list information') may be configured in a selectable menu form which will be explained in detail by referring to FIG. 4. Accordingly, the transmitting user terminal may display path list information received from the central control apparatus in the selectable menu form.

On the other hand, if a user selects a specific path in the path list information received from the central control apparatus and displayed in the transmitting user terminal, the transmitting user terminal transmits information indicating the selected specific path to the central control apparatus (S307).

In response to the path selected by the user, the central control apparatus transmits information about node functions of switch nodes included in the path selected by the user. The information about node functions of switch nodes, which is transmitted from the central control apparatus to the transmitting user terminal, may be configured in a selectable menu form which will be explained in detail by referring to FIGS. 5A and 5B. Accordingly, the transmitting user terminal may display the information about node functions of switch nodes (that is, 'node function information') in the selectable menu form (S309).

Here, the user may identify node functions of switch nodes included in the path selected by the user through the displayed menu comprising the path list information, and determine whether at least one desired function is included in the menu (S311). Here, when the desired function does not exist in switch nodes of the selected path, the user can return to the menu displaying the path list information, and select other path. In this case, the user terminal may display the menu screen of the path list information (that is, information on all configurable paths) again. When the user selects a specific path in the displayed path list information, the user terminal may transmit information indicating the selected path to the central control apparatus, receive information about node functions of switch nodes included in the newly selected path from the central control apparatus, and then display the received information in a menu form.

Alternatively, if the at least one desired function is included in at least one of switch nodes constituting the selected path in the step S311, the user may select the desired function among a plurality of node functions provided by the switch nodes, and the user terminal may transmit information indicating the at least one desired functions which should be configured for each node to the central control apparatus (S313).

When the central control apparatus receives the information indicating the at least one desired function of switch nodes constituting the selected path from the user terminal, it calculates an optimal path based on the received information (S315). Here, the central control apparatus may configure the optimal traffic path according a preconfigured path configuration policy (for example, bandwidth, QoS class, etc.) among a plurality of switch nodes providing functions corresponding to the desired functions which should be configured for each node.

Then, the central control apparatus completes the path configuration by performing processes for configuring the determined traffic path (S319). Specifically, the central control apparatus may transmit path configuration information to the switch nodes included in the configured path, and each of the switch nodes which receive the path configuration information may configure corresponding functions according to the received path configuration information. Then, the path configuration may be completed.

On the other hand, if the central control apparatus, in the step S303, receives from the transmitting user terminal a response indicating that switch node function is not necessary, it may calculate a traffic path corresponding to the path request of the transmitting user terminal without considering switch node functions (S317), and then complete the path configuration by performing the step S319. Alternatively, in response to the path request of the transmitting user terminal, the central control apparatus may transmit parameter information (for example, bandwidth, QoS class, etc.) of each path to the transmitting user terminal. In this case, the transmitting user terminal may configure a traffic path based on the parameter information received from the central control apparatus, and then transmit information about the configured traffic path to the central control apparatus.

Figure 4:
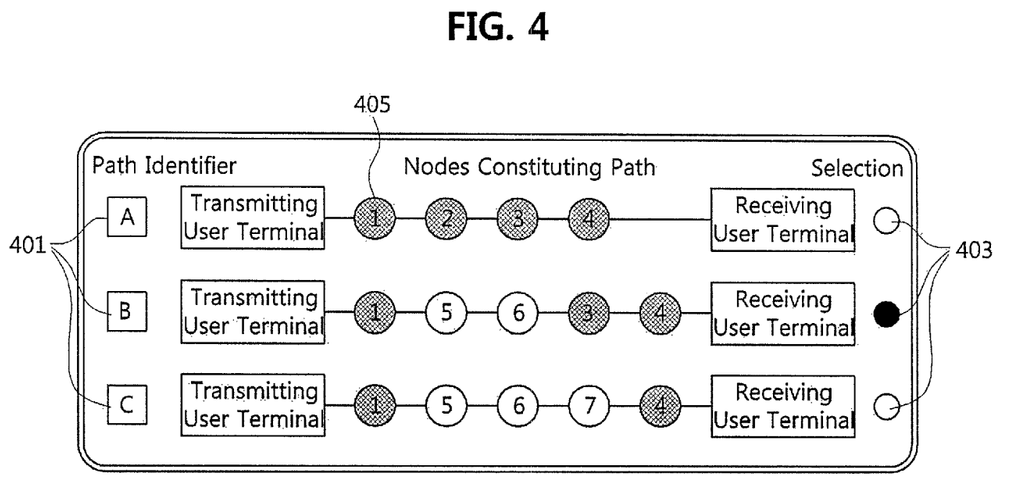
FIG. 4 illustrates an example of path list information displayed in a method for SDN based network management according to an example embodiment of the present invention.

FIG. 4 illustrates an example of path list information displayed in a method for SDN based network management according to an example embodiment of the present invention. The path list information illustrated in FIG. 4 may be displayed in a user terminal.

Referring to FIG. 4, the path list information including information about at least one path may be displayed in a selectable menu form.

That is, as shown in FIG. 4, the path list information may represent at least one path which can be configured by connecting at least one node between a transmitting user terminal and a receiving user terminal. Path identifiers 410 which can be used to identify a specific path among the displayed paths and selection tools 403 which can be used to select a specific path among the displayed paths may be included in the path list.

Here, a switch node 405 included in a path A may also be included in other paths (for example, the paths B and C), and each path may be configured based on a predefined traffic configuration policy. For example, the paths between the transmitting user terminal and the receiving user terminal may be configured based on various information such as a shortest routing path, service quality, bandwidth, transmission rate, and so on.

Also, the path list information in a menu form illustrated in FIG. 4 may be constructed by the central control apparatus, and transmitted to the user terminal. In this case, the user terminal simply displays the constructed path list information received form the central control apparatus. Alternatively, the central control apparatus may provide the user terminal with information needed for constructing the path list information (that is, information about each path and information about identifier for each path), and then the user terminal may construct the path list information in a menu form based on the received information.

Also, when the path list information is displayed as shown in FIG. 4, if the user selects a specific path in the displayed path list, the user terminal may be configured to transmit a path identifier corresponding to the specific path selected by the user to the central control apparatus.

Figure 5A:
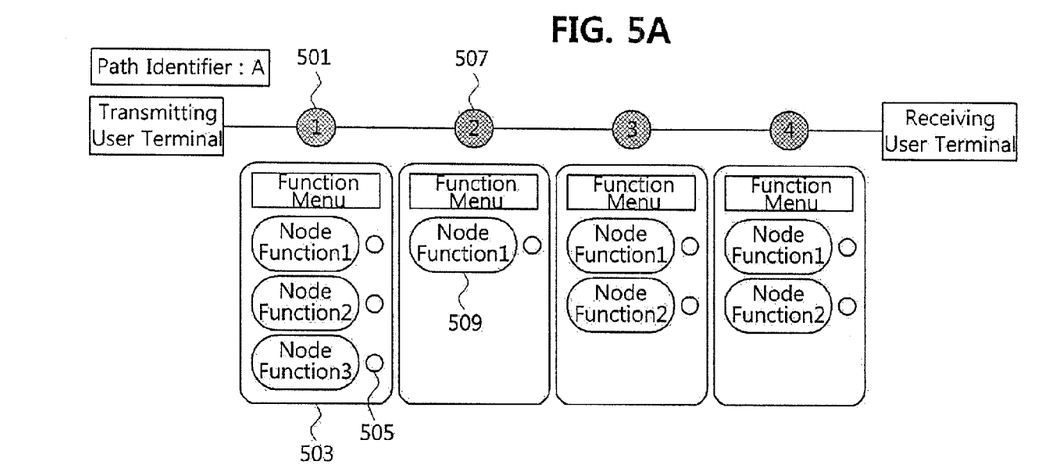
FIGS. 5A and 5B illustrate an example of a path and switch node function information for the path displayed in a method for SDN based network management according to an example embodiment of the present invention.
Figure 5B:
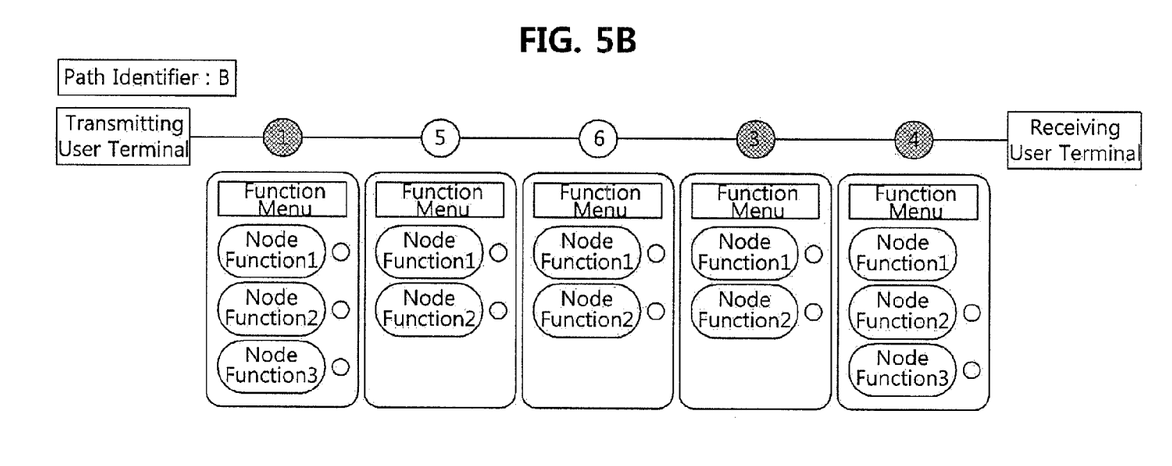

FIGS. 5A and 5B illustrate an example of a path and switch node function information for the path displayed in a method for SDN based network management according to an example embodiment of the present invention. The path and switch node function information for the path illustrated in FIGS. 5A and 5B may be displayed in a user terminal.

Referring to FIGS. 5A and 5B, in an embodiment of the present invention, when a user terminal requests path information of at least one path selected in the path list illustrated in FIG. 4 and information about functions of nodes included in the at least one selected path (that is, node function information) to the central control apparatus, the central control apparatus provides the user terminal with the path information and the node function information, and the user terminal displays the path information and the node function information provided from the central control apparatus in a menu form as illustrated in FIG. 5.

Here, as described above, node functions of each switch node may comprise a firewall function based on DPI, an encryption function, an adult-only service management function (a function of preventing adult-only services from being provided to children), an image resolution adjustment function, a charging function, a data storage function, a voice response function, and the like. Also, the node functions may have a user programmable function.

The switch node function information (for example, 503) for each node (for example, a node 1) may be displayed as related to a graphic object (for example, 501). Also, the switch node function information may be displayed with a fixed size and position as related to the corresponding switch node graphic object. Alternatively, the switch node function information may be displayed in a pull-down or a pop-up menu form appearing when the corresponding switch node graphic object is selected.

Also, the switch node function information may comprise selection tools (505) which enable the user to select at least one desired function among node functions provided from each node.

In other words, in a method for SDN based network management according to the present invention, in order for the user to select a desired path and at least one desired function of nodes in the desired path, path information of the desired path and lists of detail functions provided by each node included in the path are displayed in the menu form.

On the other hand, FIG. 5A illustrates a displayed example of path information and node function information of a path A when the user selected the path A in the path list information menu in FIG. 4. After then, if the user returns to the path list information menu in FIG. 4 and selects a path B again, path information and node function information of the path B may be displayed as illustrated in FIG. 5B.

For example, when the path A is initially selected by the user and the path information and node function information of the path A are displayed, if the user does not find desired node functions in the displayed node function information, the user can return to the path list information menu of FIG. 4. Then, the user can select another path (the path B), and the user terminal may transmit a message requesting path information and node function information of the newly selected path (the path B) to the central control apparatus. In response to the message, the central control apparatus transmits the path information and node function information of the newly selected path to the user terminal, and the user terminal may display them as illustrated in FIG. 5B.

Figure 6:
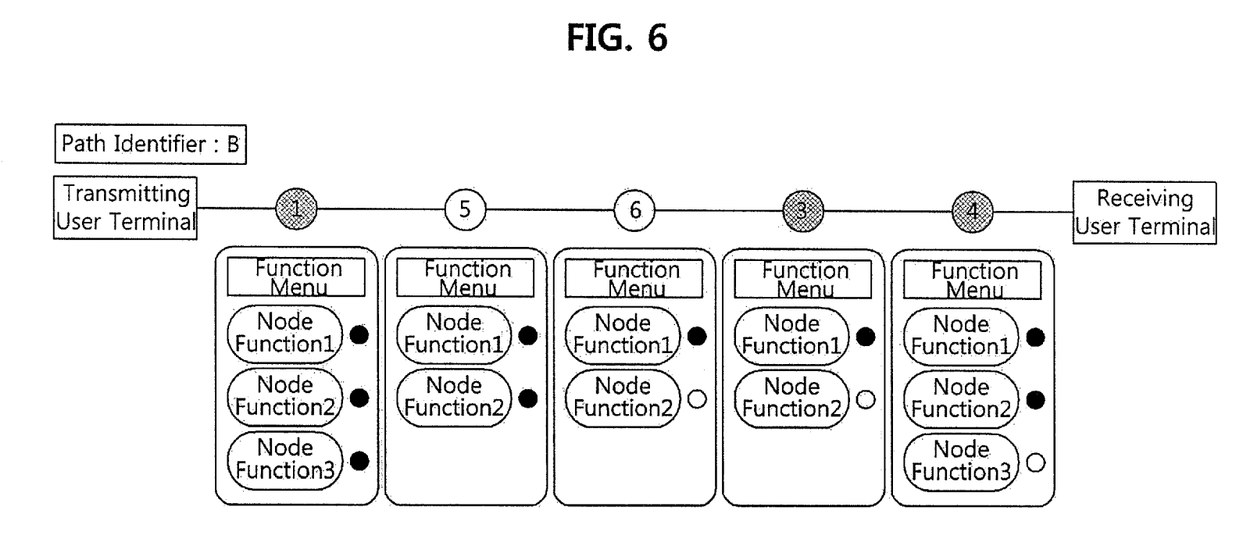
FIG. 6 illustrates functions of each switch node selected by a user in a method for SDN based network management according to an example embodiment of the present invention.

FIG. 6 illustrates functions of each switch node selected by a user in a method for SDN based network management according to an example embodiment of the present invention.

As shown in FIG. 6, if the central control apparatus provides the user terminal with the path information and node function information of the path selected by the user, the user terminal displays them in the menu form. Then, the user can select at least one node function by referring to the displayed node function information, and the user terminal information about the at least one node function selected by the user to the central control apparatus.

Here, the user terminal may transmit an identifier of the selected path (for example, the reference number of the selected path) and information indicating the at least one node function selected by the user to the central control apparatus.

When the central control apparatus receives the information indicating the at least one node function selected by the user, as described through FIG. 3, it calculates a path considering the at least one node function selected by the user, and then perform controls for configuration of the path based on the calculated path in order to establish the path between the transmitting user terminal and the receiving user terminal.

Meanwhile, the method for SDN based network management according to an embodiment of the present invention may be implemented as program instructions executable by computers, and then recorded on a computer readable medium. The computer readable medium may include a program instruction, a data file, a data structure, or a combination thereof. The program instructions recorded on the computer readable medium may be designed and configured specifically for the present invention or can be publically know and available to those who are skilled in the field of software.

Examples of the computer readable medium may include a hardware device such as a Solid State Disk (SSD), a hard disk, a floppy disk, a magnetic tape, a CD-ROM, a DVD, a floptical disk, a magneto-optical media, a ROM, a RAM, or a flash memory, which is specifically configured to store and execute the program instructions. The medium may also be a transmission media such as an optical cable, a metal wire, a waveguide, etc. including a carrier through which signal indicating program instructions and data structures is transmitted.

Examples of the program instructions can include machine codes made by, for example, a compiler, as well as high-level language codes executable by a computer with an interpreter. The above exemplary hardware devices can be configured to operate as one or more software modules in order to perform the operation in an exemplary embodiment, and the opposite is also possible.

While the example embodiments of the present invention and their advantages have been described in detail, it should be understood that various changes, substitutions and alterations may be made herein without departing from the scope of the invention.

What is claimed is:

1. A method for SDN-based network management, performed in a central control apparatus, the method comprising:
   receiving a path request message indicating a request to configure a path from a terminal;

generating path list information including information about at least one configurable path, and providing the terminal with the path list information;

receiving information indicating a specific path selected in the path list information from the terminal;

transmitting information indicating at least one node function included in at least one node constituting the selected specific path to the terminal;

receiving, from the terminal, information indicating at least one node function selected in the at least one node function included in at least one node constituting the selected specific path;

calculating a path based on the received information indicating at least one node function selected; and configuring the calculated path.

2. The method of claim 1, wherein, in the providing the terminal with the path list information, the path list information is provided to the terminal in a menu form which enables a user to select the specific path.

3. The method of claim 2, wherein the path list information includes information about at least one path, at least one identifier corresponding to the at least one path, and at least one selection tool enabling the user to select the specific path among the at least one path.

4. The method of claim 1, wherein, in the transmitting information indicating at least one node function included in at least one node constituting the selected specific path to the terminal, the information is transmitted to the terminal as configured to be a menu form in which information indicating at least one node function included in each of the at least one node constituting the selected specific path is displayed relating to the selected specific path.

5. The method of claim 1, wherein, in the generating path list information including information about at least one configurable path, the information about at least one configurable path is constructed based on at least one of routing path information, service quality information, and bandwidth information.

6. The method of claim 1, wherein the at least one node function included in each of at least one node includes at least one of a Quality of Service (QoS) control function, a security management function, an encryption management function, an image resolution management function on image data, and an adult-only service management function.

7. A method for network management, performed in a terminal, the method comprising:

transmitting a path request message indicating a request to configure a path to a central control apparatus;

receiving path list information including information about at least one configurable path from the terminal, and displaying the path list information;

transmitting information indicating a specific path selected in the path list information to the central control apparatus;

receiving information about at least one node function included in at least one node constituting the selected specific path, and displaying the information about at least one node function included in at least one node constituting the selected specific path; and transmitting, to the central control apparatus, information indicating at least one node function selected in the at least one node function included in at least one node constituting the selected specific path, wherein a path is calculated and configured by the central control apparatus based on the transmitted information indicating at least one node function selected.

8. The method of claim 7, wherein, in the displaying the path list information, the path list information is displayed in a selectable menu form enabling a user to select the specific path.

9. The method of claim 8, wherein the path list information includes information about at least one path, at least one identifier corresponding to the at least one path, and at least one selection tool supporting a user to select the specific path among the at least one path.

10. The method of claim 7, wherein, in the displaying the information about at least one node function included in at least one node constituting the selected specific path, the information about at least one node function is displayed in a menu form in which information about at least one function included in each of at least one node is related to the selected specific path and at least one of node function can be selected among the at least one node function included in each of at least one node.

11. The method of claim 7, wherein the path request message includes at least one of routing path information, service quality information, and bandwidth information.

12. The method of claim 7, wherein the at least one node function included in at least one node includes at least one of a Quality of Service (QoS) control function, a security management function, an encryption management function, an image resolution management function on image data, and an adult-only service management function.

13. A control apparatus based on software defined network, the control apparatus comprising:

a processing part providing, in response to a path request of a terminal, the terminal with path list information about at least one configurable path and node function information about at least node function included in at least one node constituting a specific path selected in the path list information; and a communication part performing communications with the terminal, and transmitting, according to control of the processing part, the path list information and the node function information;

wherein the processing part calculates the specific path based on at least one node function selected in the node function information, and controls each of the at least one node constituting the specific path so as to configure the specific path.

14. The method of claim 13, wherein the processing part constructs the path list information and the node function information in menu forms in which the specific path can be selected in the path list information and at least one node function can be selected in the node function information.

* * * * *